(12) United States Patent
Ni et al.

(10) Patent No.: US 12,406,181 B2
(45) Date of Patent: Sep. 2, 2025

(54) METHOD, DEVICE, AND COMPUTER PROGRAM PRODUCT FOR UPDATING MODEL

(71) Applicant: EMC IP Holding Company LLC, Hopkinton, MA (US)

(72) Inventors: Jiacheng Ni, Shanghai (CN); Qiang Chen, Shanghai (CN); Zijia Wang, WeiFang (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 998 days.

(21) Appl. No.: 17/195,116

(22) Filed: Mar. 8, 2021

(65) Prior Publication Data
US 2022/0245448 A1    Aug. 4, 2022

(30) Foreign Application Priority Data
Jan. 29, 2021   (CN) .......................... 202110127324.1

(51) Int. Cl.
*G06N 3/08* (2023.01)
*G06N 3/04* (2023.01)

(52) U.S. Cl.
CPC ................. *G06N 3/08* (2013.01); *G06N 3/04* (2013.01)

(58) Field of Classification Search
CPC .......... G06N 3/08; G06N 3/04; G06N 3/0464; G06N 3/0475; G06N 3/0495;
(Continued)

(56) References Cited

U.S. PATENT DOCUMENTS

2020/0151619 A1\* 5/2020 Mopur .................... H04L 67/12
2020/0387836 A1   12/2020 Nasr-Azadani et al.
(Continued)

FOREIGN PATENT DOCUMENTS

CN          110110792 A      8/2019

OTHER PUBLICATIONS

J. Lu, A. Liu, F. Dong, F. Gu, J. Gama and G. Zhang, "Learning under Concept Drift: A Review," in IEEE Transactions on Knowledge and Data Engineering, vol. 31, No. 12, pp. 2346-2363, Dec. 1, 2019, doi: 10.1109/TKDE.2018.2876857. (Year: 2019).\*
(Continued)

*Primary Examiner* — Kakali Chaki
*Assistant Examiner* — Robert N Day
(74) *Attorney, Agent, or Firm* — Ryan, Mason & Lewis, LLP (57) ABSTRACT

Embodiments of the present disclosure provide a method, a device, and a computer program product for updating a model. The method includes: determining a performance metric of a trained machine learning model at runtime; determining a homogeneity degree between a verification data set processed by the machine learning model at runtime and a training data set used to train the machine learning model; determining a type of a conceptual drift of the machine learning model based on the performance metric and the homogeneity degree; and performing an update of the machine learning model based on the type of the conceptual drift, where the update includes a partial update or a global update. In this way, a desired performance of the machine learning model can be maintained, while avoiding excessive time costs and computational resource costs caused by frequent global updates.

20 Claims, 4 Drawing Sheets

(58) Field of Classification Search
CPC ...... G06N 3/0499; G06N 3/0895; G06N 3/09; G06N 3/091; G06N 3/092; G06N 3/094; G06N 3/096; G06N 3/098; G06N 3/0985
See application file for complete search history.

(56) References Cited

U.S. PATENT DOCUMENTS

2021/0224687 A1* 7/2021 Goldszmidt ........ G06F 18/2415
2022/0129712 A1* 4/2022 Sallee ...................... G06N 3/04

OTHER PUBLICATIONS

Wikipedia, "Deep Learning," https://en.wikipedia.org/wiki/Deep_learning#Deep_neural_networks, Mar. 1, 2021, 32 pages.
Wikipedia, "Autoencoder," https://en.wikipedia.org/wiki/Autoencoder, Feb. 22, 2021, 13 pages.
Wikipedia, "K-Means Clustering," https://en.wikipedia.org/wiki/K-means_clustering, Mar. 6, 2021, 16 pages.
Chinese Patent Application No. 2021101273241, "Chinese Search Report," Feb. 27, 2025, 2 Pages.
Chinese Patent Application No. 2021101273241, "Chinese Office Action," Feb. 27, 2025, 3 Pages.

* cited by examiner

METHOD, DEVICE, AND COMPUTER PROGRAM PRODUCT FOR UPDATING MODEL

RELATED APPLICATION(S)

The present application claims priority to Chinese Patent Application No. 202110127324.1, filed Jan. 29, 2021, and entitled "Method, Device, and Computer Program Product for Updating Model," which is incorporated by reference herein in its entirety.

FIELD

Embodiments of the present disclosure relate to the field of artificial intelligence (AI), and more particularly, to a method, a device, and a computer program product for updating a model.

BACKGROUND

At present, machine learning technologies are widely used in various fields such as computer vision, human-computer interaction, recommendation systems, and security protection. To obtain an applicable machine learning model, it is necessary to use training data to train the model. The time cost and resource overhead of model training are usually considerable.

Unlike other software, due to environmental changes such as changes in the behavior of an object or a drift of a sensor that collects data, the performance of a machine learning model may be degraded over time. Therefore, the machine learning model needs to be updated so that the machine learning model can adapt to the new environment and provide desirable performance.

SUMMARY

Embodiments of the present disclosure provide a solution for updating a model.

In a first aspect of the present disclosure, a method for updating a model is provided. The method includes: determining a performance metric of a trained machine learning model at runtime; determining a homogeneity degree between a verification data set processed by the machine learning model at runtime and a training data set used to train the machine learning model; determining a type of a conceptual drift of the machine learning model based on the performance metric and the homogeneity degree; and performing an update of the machine learning model based on the type of the conceptual drift, where the update includes a partial update or a global update.

In a second aspect of the present disclosure, an electronic device is provided. The electronic device includes: at least one processor; and at least one memory storing computer-executable instructions, the at least one memory and the computer-executable instructions being configured to cause, together with the at least one processor, the electronic device to perform actions. The actions include: determining a performance metric of a trained machine learning model at runtime; determining a homogeneity degree between a verification data set processed by the machine learning model at runtime and a training data set used to train the machine learning model; determining a type of a conceptual drift of the machine learning model based on the performance metric and the homogeneity degree; and performing an update of the machine learning model based on the type of the conceptual drift, where the update includes a partial update or a global update.

In a third aspect of the present disclosure, a computer program product is provided. The computer program product is tangibly stored in a non-volatile computer-readable medium and includes computer-executable instructions, wherein when executed, the computer-executable instructions cause a device to perform actions. The actions include: determining a performance metric of a trained machine learning model at runtime; determining a homogeneity degree between a verification data set processed by the machine learning model at runtime and a training data set used to train the machine learning model; determining a type of a conceptual drift of the machine learning model based on the performance metric and the homogeneity degree; and performing an update of the machine learning model based on the type of the conceptual drift, where the update includes a partial update or a global update.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings, and in the example embodiments of the present disclosure, the same reference numerals generally represent the same components.

DETAILED DESCRIPTION

The principles of the present disclosure will be described below with reference to several example embodiments shown in the accompanying drawings. Although illustrative embodiments of the present disclosure are shown in the accompanying drawings, it should be understood that these embodiments are described merely to enable those skilled in the art to better understand and then implement the present disclosure, and do not limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" denotes "at least one additional embodiment." The terms "first," "second," and the like may refer to different or identical objects. Other explicit and implicit definitions may also be included below.

As used herein, the term "machine learning" refers to processing involving high-performance computing, machine learning, and artificial intelligence algorithms. Herein, the term "machine learning model" may also be referred to as a "learning model," "learning network," "network model," or "model." A "neural network" (NN) or "deep neural network" (DNN) is a deep learning model. In general, a machine learning model is capable of receiving input data, performing predictions based on the input data, and outputting prediction results.

Machine learning can mainly be divided into three stages, namely, a training stage, a testing stage, and an application stage (also referred to as an inference stage). During the training stage, a given machine learning model can be trained using a large number of training samples and iterated continuously until the machine learning model can obtain, from the training samples, consistent inferences which are similar to the inferences that human intelligence can make. Through training, the machine learning model may be considered as being capable of learning mapping or an association relationship between inputs and outputs from training data. After training, a set of parameter values of the machine learning model is determined. In the testing stage, the trained machine learning model may be tested by using test samples to determine the performance of the machine learning model. In the application stage, the machine learning model can be used to process, based on the set of parameter values obtained from the training, actual input data to provide corresponding outputs.

As mentioned above, in order to deal with the degradation of model performance, model updates need to be performed. Conventionally, it is determined whether to retrain a machine learning model by testing the accuracy of the model. However, the retraining of the entire model takes a long time and requires a large computational overhead. Therefore, in practical applications, the frequency of such retraining is relatively low, and retraining may be triggered only when the accuracy is unacceptable. Another solution is to use small samples to perform on-line training at a high frequency and redeploy the trained model to the site. However, the computational overhead of this solution is higher, and it also has requirements on the network environment.

An embodiment of the present disclosure provides a solution for adaptive model updating. In this solution, a type of a conceptual drift of a machine learning model is determined based on a performance metric of the machine learning model at runtime and a homogeneity degree between a training data set and a runtime data set. Depending on the determined type of the conceptual drift, a partial update or a global update is performed on the machine learning model. With this solution, an appropriate update mode can be selected according to different concept shifts of the machine learning model. In this way, a desired performance of the machine learning model can be maintained, while avoiding excessive time costs and computational resource costs caused by frequent global updates.

Figure 1:
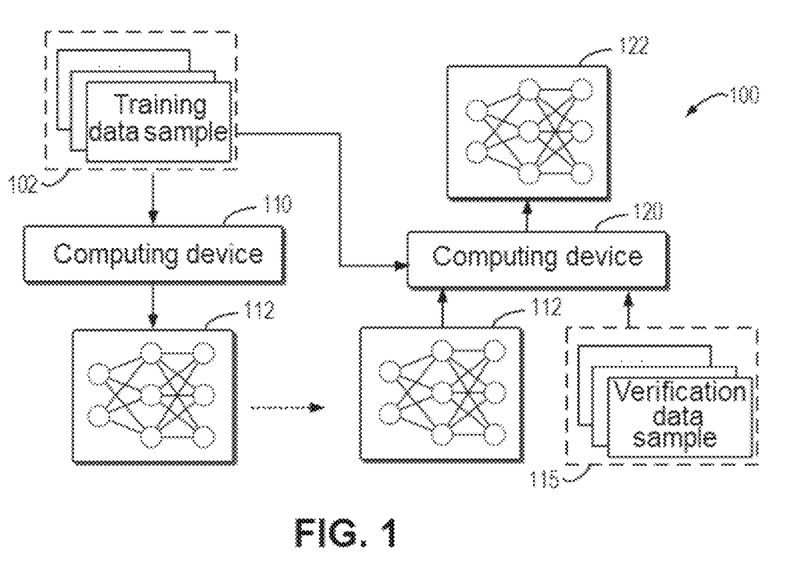
FIG. 1 illustrates a schematic diagram of an environment in which embodiments of the present disclosure can be implemented.

FIG. 1 illustrates a schematic diagram of environment 100 in which embodiments of the present disclosure can be implemented. In the example of FIG. 1, computing device 110 is configured to train machine learning model 112 with training data set 102. Training data set 102 includes a plurality of training data samples. Trained machine learning model 112 can be provided to run in an actual application scenario. For example, if machine learning model 112 is a face authentication model for authenticating whether a user is a valid user, after training, machine learning model 112 can be deployed to run on a user's terminal to perform a task of face authentication.

Machine learning model 112 can include any type of model or models capable of performing various processing tasks. Some examples of machine learning model 112 include, but are not limited to, a support vector machine (SVM) model, a Bayesian model, a random forest model, and various deep learning/neural network models such as convolutional neural networks (CNN), recurrent neural networks (RNN), and so on.

As machine learning model 112 runs, machine learning model 112 needs to be updated due to changes in the environment, such as changes in the behavior of an object to be processed or a drift of a sensor that collects data. In environment 100, computing device 120 is configured to update machine learning model 112 to provide updated machine learning model 122. In the embodiments of the present disclosure, the update of machine learning model 112 refers to training data set 102 previously used to train machine learning model 112, and also refers to a verification data set 115 processed by machine learning model 112 at runtime (also referred to in some embodiments herein as a validation data set). Verification data set 115 includes a plurality of verification data samples. The update of machine learning model 112 by computing device 120 will be discussed in more detail below.

Computing device 110 or computing device 120 may include or be implemented as any computing system or server with computing capabilities. In some cases, computing device 110 or computing device 120 may be a computing device with limited processing and/or storage resources, for example, a terminal device, such as a mobile phone, a laptop computer, a desktop computer, a tablet computer, an edge computing device of an Internet of Things (IoT), an edge gateway, etc. Although shown as separate devices in FIG. 1, computing device 110 and computing device 120 may be integrated into a single computing system in some embodiments.

Example embodiments of computer interaction of the present disclosure will be discussed in more detail below with reference to the accompanying drawings.

Figure 2:
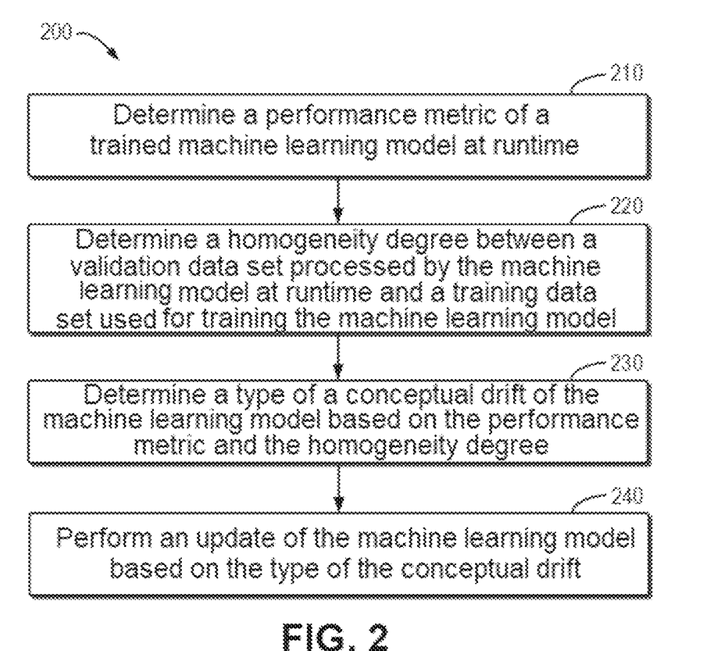
FIG. 2 illustrates a flow chart of a process for updating a model according to some embodiments of the present disclosure.

Referring now to FIG. 2, a flow chart is shown of process 200 for updating a model according to some embodiments of the present disclosure. Process 200 may be implemented by computing device 120. To facilitate discussion, process 200 will be discussed with reference to FIG. 1.

As shown in FIG. 2, in block 210, computing device 120 determines a performance metric of trained machine learning model 112 at runtime, and in block 220, computing device 120 determines a homogeneity degree between a validation data set processed by machine learning model 112 at runtime and a training data set used for training the machine learning model.

According to the embodiments of the present disclosure, it is desirable to determine a type of concept shift of the machine learning model by exploring some factors, so as to determine an efficient, suitable, and low-cost update mode for current machine learning model 112. Here, the type of the conceptual drift of machine learning model 112 relative to an expected target is determined based on the performance metric of machine learning model 112 in the runtime stage and the homogeneity or the homogeneity degree between the processed data set and the training data set.

Machine learning model 112 may have been previously trained, for example, trained based on training data set 102. Before discussing the determination of the performance metric and the homogeneity degree in detail, an example structure of the machine learning model will be briefly introduced.

Figure 3:
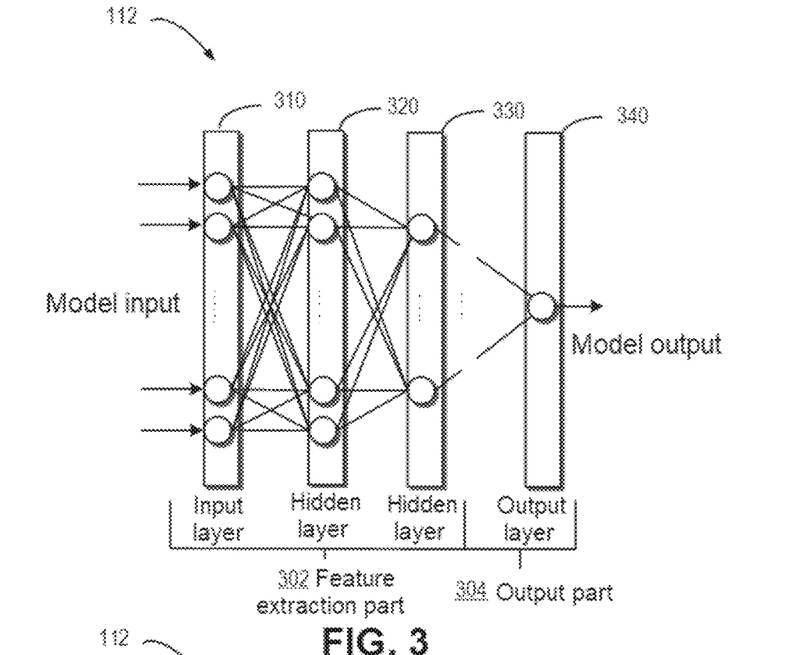
FIG. 3 illustrates an example of a structure of a machine learning model according to some embodiments of the present disclosure.

FIG. 3 illustrates an example structure of machine learning model 112. In the example of FIG. 3, machine learning model 112 shows an example structure of a deep neural network (DNN). DNN is an artificial neural network with multiple layers between an input layer and an output layer. As shown in FIG. 3, machine learning model 112 may include input layer 310, a plurality of hidden layers 320, 330, etc., and output layer 340. It can be understood that the neural network may also include other numbers of hidden layers and corresponding numbers of neurons. The scope of the present disclosure is not limited in this respect.

In the embodiment shown in FIG. 3, each of one or more layers in machine learning model 112 includes a plurality of neurons. Each of these neurons may include an activation function, and the activation function may be, for example, a non-linear or linear function. The function may be, for example, a sine function or other functions. In addition, the same activation function or a different activation function can be specified for each neuron. The scope of the present disclosure is not limited in this respect.

In the example of DNN, machine learning model 112 is a typical forward network, and the to-be-processed data (i.e., model inputs) flows from the input layer to the output layer without looping back. DNN creates a virtual neuron map. During training, the connections between neurons are assigned random values or "weights," referred to as parameter values. The weights are used to adjust the inputs to the neurons to get outputs. If the current model cannot accurately identify a specific pattern, the training algorithm will adjust the weights. In this way, the training algorithm can make some parameters more influential until it determines a processing operation to properly process the data.

In some embodiments of the present disclosure, in order to facilitate adaptive updating of the model, overall machine learning model 112 may be divided into a feature extraction part and an output part. The feature extraction part is configured to receive a model input and extract a feature representation of a model output. The output part is configured to map the feature representation to the model output. In the example of FIG. 3, input layer 310 and the plurality of hidden layers 320, 330, etc. therein constitute feature extraction part 302 of machine learning model 112. The output of the last hidden layer of feature extraction part 302 is referred to as a feature representation of the model input. Output layer 340 is referred to as output part 304, and the output part is configured to map the feature representation to the model output.

Figure 4:
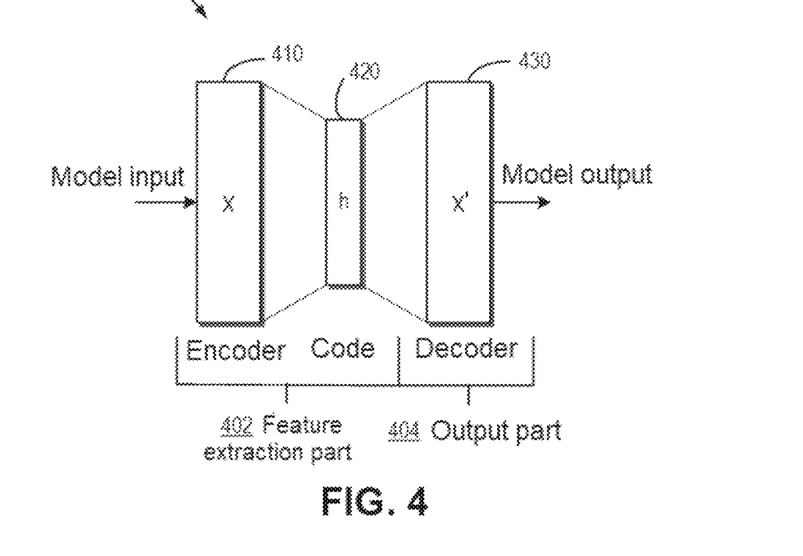
FIG. 4 illustrates another example of a structure of a machine learning model according to some embodiments of the present disclosure.

FIG. 4 also illustrates another example of machine learning model 112. In this example, machine learning model 112 is configured as an autocoder. The autocoder can learn efficient data coding in an unsupervised way to learn a neural network that copies model inputs to model outputs. The purpose of the autocoder is to learn the feature representations (coding) of the model inputs by training the network to ignore signal "noises." As shown in FIG. 4, machine learning model 112 configured as an autocoder includes encoder 410 (denoted as X) for mapping a model input to code 420 (denoted as "h") and reconstructed decoder 430 (denoted as X') for simulating code 420 into an original model input. Encoder 410 and decoder 430 include one or more hidden layers described for generating and processing code.

Encoder 410 processes the model input and generates code 420 corresponding to the input. The learning of code 420 is generally used for dimension reduction of data. In addition to dimension reduction, decoder 430 in machine learning model 112 also learns a data reconstruction side to try to generate a representation that is as close to its original input as possible from the simplified code, to obtain a model output. There are many variations of the basic model, aiming at forcing the input learning representation to present useful attributes.

In some embodiments of the present disclosure, in order to facilitate adaptive updating of the model, overall machine learning model 112 configured as an autocoder may also be divided into a feature extraction part and an output part. In the example of FIG. 4, encoder 410 and code 420 constitute feature extraction part 402 of machine learning model 112. Decoder 430 is referred to as output part 404.

FIGS. 3 and 4 show some examples of machine learning model 112. According to demands and configurations, other model structures can also be used. The embodiments of the present disclosure are not limited in this respect.

As mentioned above, after machine learning model 112 is trained completely and run in the actual environment, for the purpose of model update, a performance metric of machine learning model 112 at runtime and a homogeneity degree between verification data set 115 and training data set 102 can be detected.

When machine learning model 112 is running, computing device 120 may collect verification data set 115. Verification data set 115 includes at least a plurality of verification data samples, and each of the verification data samples includes a model input processed by machine learning model 112 at runtime. In some embodiments, verification data set 115 may also include real outputs corresponding to the plurality of verification data samples (instead of the predicted outputs given by machine learning model 112 after processing the verification data samples). The real outputs can be collected in a variety of ways. For example, if machine learning model 112 is configured to predict a click-through rate of recommended information, the real click-through rate of the recommended information can be collected from a server as the corresponding real output.

In some embodiments, the performance metric of machine learning model 112 may include an accuracy metric and a sequence metric. The accuracy metric is used to measure the difference between the predicted outputs given by machine learning model 112 on the verification data samples at runtime and the real outputs. The greater the difference is, the lower the accuracy is. The sequence metric is used to measure whether the trend of the predicted outputs given by machine learning model 112 on the verification data samples at runtime is consistent with the trend of the real outputs, that is, whether the output sequences are consistent. For example, for some verification data samples, the corresponding real outputs are 0.1, 0.2, and 0.3, respectively, but the predicted outputs given by machine learning model 112 are 1, 2, and 3, respectively, then the absolute difference between the predicted outputs and the real outputs is relatively large, but the trend of the predicted outputs is similar to the trend of the real outputs, so the sequence metric can indicate such trend similarity.

In some embodiments, the selection of the accuracy metric and the sequence metric may be performed based on a processing type of the output part of machine learning model 112. In general, for the processing type of the output part of machine learning model 112, the output part of machine learning model 112 may include regression processing and/or classification processing.

Regression processing usually maps the feature representations extracted by the feature extraction part to model outputs within a continuous range of values. For example, assuming that the model input is expressed as x and the processing of the feature extraction part is expressed as f(x), then the regression processing of the output part can be expressed as $y=w^T f(x)$. The classification processing usually maps the feature representations extracted by the feature extraction part to model outputs that belong to a plurality of discrete categories. For example, the classification processing of the output part can be expressed as $y=\text{sigmoid}(w^T f(x))$, where it is assumed that the processing of the output part is a sigmoid function.

Depending on the regression processing or classification processing of the output part of machine learning model 112, the sequence metric and/or accuracy metric of machine learning model 112 may have different choices. In some embodiments, in an example based on regression processing, the sequence metric of machine learning model 112 may include a Pearson correlation between the predicted outputs given by machine learning model 112 on verification data set 115 and the real outputs thereof, which is also referred to as a Pearson coefficient. In an example based on regression processing, the accuracy of machine learning model 112 is determined by measuring a Root Mean Square Error (RMSE), a Mean Square Error (MSE), or the like between the predicted outputs and the real outputs.

In some embodiments, in an example based on classification processing, the sequence metric of machine learning model 112 may include an Area Under ROC Curve (AUC) between the predicted outputs given by machine learning model 112 on verification data set 115 and the real outputs thereof. AUC refers to an area under a Receiver Operating Characteristic (ROC) curve of machine learning model 112. ROC is a curve drawn by a True Positive Rate (TPR) and a False Positive Rate (FPR) determined for the predicted outputs and the real outputs. In an example based on classification processing, the accuracy metric of machine learning model 112 can be measured by determining the classification accuracy of the predicted outputs (which indicate the classification predicted by machine learning model 112 on the validation data samples) based on the real outputs (which indicate the correct classification of the verification data samples).

Example performance metrics for different types of output parts are summarized in Table 1 below:

TABLE 1

Example performance metrics for different types of output parts

| | Sequence Metric | Accuracy Metric |
|---|---|---|
| Regression Processing | Pearson Correlation | RMSE |
| Classification Processing | AUC | Classification Accuracy |

The example performance metrics given above are well-known to those skilled in the field of machine learning, and will not be repeated here. It should be understood that the performance metrics given above, especially the metrics listed in Table 1, are just some examples. In some embodiments, other sequence metrics and accuracy metrics can also be selected. In other embodiments, other performance metrics can also be utilized. The performance metric is used to measure the current working performance of machine learning model 112. If machine learning model 112 cannot give satisfactory performance, machine learning model 112 may need to be updated.

In addition to the performance metric, the homogeneity degree between verification data set 115 and training data set 102 is also considered. The homogeneity degree is used to indicate whether the distribution of the verification data set is consistent with the distribution of the training data set. Since machine learning model 112 learns from the training data set, if it faces new features in the model input in practical applications, it may not be able to exhibit good performance. The homogeneity degree is used to determine whether such a situation occurs during operation.

In some embodiments, the homogeneity degree between verification data set 115 and training data set 102 may be determined in the feature space of the data. Specifically, computing device 120 may determine or obtain from computing device 110 respective feature representations of the multiple training data samples in training data set 102 (referred to as "training feature representations"). The training feature representation is a feature representation extracted by, for example, a feature extraction part of machine learning model 112. Computing device 120 may also use the feature extraction part of machine learning model 112 to extract feature representations of multiple verification data samples in verification data set 115 (referred to as "verification feature representations"). Computing device 120 may determine the homogeneity degrees between the multiple verification feature representations and the multiple training feature representations.

A feature representation can be composed of values in multiple dimensions. To measure the homogeneity degree between two sets of feature representations, in some embodiments, computing device 120 clusters multiple training feature representations to determine corresponding centroids of multiple clusters of the multiple training feature representations. For example, computing device 120 may use a clustering algorithm, such as a K-means clustering algorithm, to cluster the training feature representations. The clustering algorithm can classify feature representations with high similarity into the same cluster, and classify feature representations with high difference into different clusters. After the clustering is completed, computing device 120 can obtain multiple clusters and determine corresponding centroids of the multiple clusters, for example, represented as (c1, c2, . . . , cK). In some embodiments, the number of clusters (for example, K) may be predetermined. For example, in an embodiment of the classification processing, K may be set to be equal to the number of classes. Of course, other numbers of clusters can also be set. In some examples, the centroid of each cluster may also consist of values in multiple dimensions.

When obtaining to measure the homogeneity degree between currently collected verification data set 115 and training data set 102, computing device 120 may determine corresponding distances from multiple verification feature representations extracted from the verification data samples of verification data set 115 to corresponding centroids of multiple clusters. When determining the distances, for each verification feature representation, computing device 120 may determine a cluster having the smallest difference with the verification feature representation, and assign the verification feature representation to the cluster corresponding to the centroid. The distance between the verification feature representation and each cluster can be represented by, for example, a Euclidean distance or other measurements that measure the similarity between vectors. The assignment of the verification feature representations to clusters can be determined based on minimum mean square Euclidean distances (MSEDs). This is similar to dividing the verification feature representations according to a Voronoi diagram generated by the average values. MSED can be used to measure the homogeneity degree between a verification feature representation and a training feature representation.

At block 230, computing device 120 determines a type of a conceptual drift of machine learning model 112 based on the performance metric and the homogeneity degree.

In machine learning, a conceptual drift means that statistical characteristics of a target variable that the model is trying to predict change in an unforeseen way over time. This will lead to problems, because the prediction by the model becomes increasingly inaccurate over time. In the embodiments of the present disclosure, the conceptual drifts of machine learning are classified into different types. In some embodiments, the types of conceptual drifts include drifts related to the output part of machine learning model 112, denoted as P(Y). In some embodiments, the types of conceptual drifts include drifts related to model inputs of machine learning model 112, denoted as P(X). In some embodiments, the types of conceptual drifts include drifts related to both of the output part and model inputs of machine learning model 112, denoted as P(X|Y).

Among the above types of conceptual drifts, different types may correspond to different update modes of machine learning model 112.

In some embodiments, computing device 120 determines whether the performance metric and homogeneity degree of machine learning model 112 meet the requirements. For example, computing device 120 may determine that the performance metric of machine learning model 112 does not meet the performance metric requirements, and determine that the homogeneity degree is lower than the homogeneity threshold.

In some embodiments, if computing device 120 determines that the sequence metric in the performance metric of machine learning model 112 is still in an acceptable range (for example, exceeding the metric threshold), but the accuracy metric decreases (for example, below the accuracy threshold), this may mean that the sequence trend of the model outputs predicted by machine learning model 112 is basically the same as the sequence trend of the real outputs, but the accuracy of machine learning model 112 is reduced, (that is, the absolute difference between the predicted model outputs and the real outputs is relatively large). This may be because the prediction result of machine learning model 112 is overestimated or underestimated. This situation can be classified into a type of conceptual drift (referred to as a "first type" of conceptual drift P(Y)). In response to this conceptual drift, machine learning model 112 can be updated by adding a model calibrator after the output part and performing output calibration.

In some embodiments, if computing device 120 determines that the sequence metric of machine learning model 112 is lower than the sequence metric threshold and the accuracy metric is also lower than the accuracy threshold, that is, the performance of machine learning model 112 cannot meet the requirements in terms of both sequence and accuracy, then computing device 120 may further determine the type of the conceptual drift of the machine learning model based on a comparison between the homogeneity degree and a homogeneity threshold. Such update is referred to as a local update (sometimes referred to as a first local update)

In some embodiments, if computing device 120 determines that the homogeneity degree of machine learning model 112 exceeds the homogeneity threshold, that is, there is little difference between the verification feature representation and the training feature representation, this means that the feature extraction of the model input by machine learning model 112 may be accurate. The unsatisfactory performance metric of the model may be due to the output part of machine learning model 112. This situation may occur because the labels used as supervision information in training data set 102 are not accurate enough. For example, all the categories in training data set 102 are not labeled, or the labeling of the classification or regression results deviates from the actual situation. This situation can be classified as a type of concept drifts (referred to as a "second type" of concept drift P(X)). For this type of conceptual drift, machine learning model 112 can retrain the output part of machine learning model 112 without training other parts of machine learning model 112, such as the feature extraction part. Such retraining can be referred to as local retraining, and sometimes referred to as a second local update.

In some embodiments, when the performance of machine learning model 112 in terms of both sequence and accuracy cannot meet the requirements, if computing device 120 determines that the homogeneity degree of machine learning model 112 is also lower than the homogeneity threshold, there may be a high probability that the feature extraction part of machine learning model 112 cannot be applied to the current situation. This situation of machine learning model 112 can be classified as a type of concept drifts (referred to as a "third type" of concept drifts P(X|Y). For this type of conceptual drift, machine learning model 112 may need to retrain the feature extraction part and the output part of machine learning model 112, that is, perform global retraining on the machine learning model.

Table 2 summarizes the determination of the different conceptual drift types discussed above. In Table 2, "✓" indicates that the corresponding performance metric or homogeneity degree meets the requirements (for example, higher than the corresponding threshold), and "x" indicates that the corresponding performance metric or homogeneity degree does not meet the corresponding requirements.

TABLE 2

Determination of the type of conceptual drift

| Type of conceptual drift | Accuracy Metric | Sequence Metric | Homogeneity degree |
|---|---|---|---|
| P(Y) | x | ✓ | |
| P(X) | x | x | ✓ |
| P(X|Y) | x | x | x |

At block 240, computing device 120 performs an update of machine learning model 112 based on the type of the conceptual drift. After the update, updated machine learning model 122 is obtained.

The update includes a partial update or a global update. As discussed above, for different types of conceptual drifts, machine learning model 112 can be updated in different ways.

In some embodiments, the partial update includes output calibration of the output part of machine learning model 112 in the case of a concept shift of the first type. In such embodiment, compared with machine learning model 112, updated machine learning model 122 includes additional output calibration processing in structure.

In some embodiments, for regression processing, computing device 120 may determine parameters for reverse regression based on verification data set 115, for example, the reverse regression between predicted output Y' given by verification data set 115 and real model output Y, to calibrate the output part of machine learning model 112, so that the error between the calibrated output and the real output is reduced or an expected goal is achieved. In some embodiments, for the classification processing, computing device 120 may determine the output calibration of the output part of machine learning model 112 based on the isotonic regression.

In some embodiments, the partial update includes local retraining of the output part of machine learning model 112 in the case of a concept shift of the second type. In the local retraining, parameter values of the output part will be updated, but the parameter values of the feature extraction part will not be updated. In some embodiments, the global update includes global retraining of machine learning model 112 in the case of a concept shift of the third type. The global retraining will lead to re-determination of parameter values of the feature extraction part and the output part of machine learning model 112.

In some embodiments, the local retraining or the global retraining may be performed based at least on verification data set 115. In some embodiments, training in local retraining or global retraining can be performed by adding verification data set 115 to training data set 102.

The determination of the output calibration, local retraining, or global retraining can utilize learning techniques currently available or to be developed in the future. The embodiments of the present disclosure are not limited in this respect.

Figure 5:
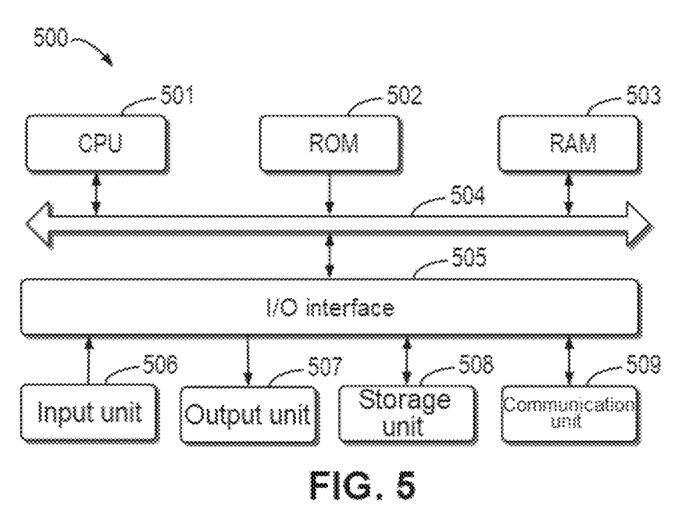
FIG. 5 illustrates a block diagram of an example device that may be configured to implement the embodiments of the present disclosure.

FIG. 5 shows a schematic block diagram of example device 500 that may be configured to implement the embodiments of the present disclosure. Device 500 may be used to implement process 200 of FIG. 2. Device 500 may be implemented as or included in computing device 110 and/or computing device 120 in environment 100 illustrated in FIG. 1.

As shown in the figure, device 500 includes central processing unit (CPU) 501 that may perform various appropriate actions and processing according to computer-executable instructions stored in read-only memory (ROM) 502 or computer-executable instructions loaded from storage unit 508 into random access memory (RAM) 503. In RAM 503, various programs and data required for the operation of device 500 may also be stored. CPU 501, ROM 502, and RAM 503 are connected with each other through bus 504. Input/output (I/O) interface 505 is also connected to bus 504.

Multiple components in device 500 are connected to I/O interface 505, including: input unit 506, such as a keyboard and a mouse; output unit 507, such as various types of displays and speakers; storage unit 508, such as a magnetic disk and an optical disk; and communication unit 509, such as a network card, a modem, and a wireless communication transceiver. Communication unit 509 allows device 500 to exchange information/data with other devices through a computer network such as the Internet and/or various telecommunication networks.

CPU 501 performs the various methods and processing described above, such as process 200. For example, in some embodiments, process 200 may be implemented as a computer software program or a computer program product that is tangibly contained in a machine-readable medium, such as a non-transitory computer-readable medium, for example, storage unit 508. In some embodiments, part or all of the computer program may be loaded and/or installed to device 500 via ROM 502 and/or communication unit 509. When the computer program is loaded onto RAM 503 and executed by CPU 501, one or more steps of process 200 described above may be performed. Alternatively, in other embodiments, CPU 501 may be configured in any other suitable manners (for example, by means of firmware) to perform process 200.

Those skilled in the art should understand that the steps of the above method of the present disclosure may be implemented by a universal computing apparatus, and may be centralized on a single computing apparatus or distributed over a network composed of a plurality of computing apparatuses. Optionally, they may be implemented using program code executable by a computing apparatus, so that they may be stored in a storage apparatus and executed by a computing apparatus, or they may be made into integrated circuit modules respectively, or they may be implemented by making a plurality of modules or steps thereof into a single integrated circuit module. Thus, the present disclosure is not limited to any particular combination of hardware and software.

It should be understood that although some apparatuses or sub-apparatuses of the device are mentioned in the above detailed description, such division is merely illustrative rather than mandatory. In fact, the features and functions of two or more apparatuses described above may be embodied in one apparatus according to the embodiments of the present disclosure. Conversely, the features and functions of one apparatus described above can be embodied by further dividing the apparatus into multiple apparatuses.

The foregoing are merely optional embodiments of the present disclosure and are not intended to limit the present disclosure, and for those skilled in the art, the present disclosure can have various modifications and changes. Any modifications, equivalent replacements, improvements, etc., made within the spirit and principles of the present disclosure shall be included in the scope of protection of this disclosure.

What is claimed is:

1. A method, comprising:
determining, in a machine learning system implemented utilizing processor and memory resources of at least one computing device, a performance metric of a machine learning model at runtime, wherein the machine learning model is a trained machine learning model, trained using a training data set;
determining, in the machine learning system, a homogeneity degree between a verification data set processed by the machine learning model at runtime and the training data set used to train the machine learning model, the verification data set comprising a plurality of verification data samples, each of the verification data samples including a corresponding model input processed by the machine learning model at runtime, wherein the homogeneity degree is determined by performing clustering between multiple feature representations of the training data set to obtain a plurality of clusters, determining feature representations of the verification data samples, computing differences between the feature representations of the verification data samples and one or more characteristics of the clusters, and determining the homogeneity degree based on the computed differences;

determining, in the machine learning system, a type of a conceptual drift of the machine learning model based on the performance metric and the homogeneity degree;
performing, in the machine learning system, an update of the machine learning model based on the type of the conceptual drift, wherein the update comprises a partial update or a global update;
executing the updated machine learning model in the machine learning system to process one or more additional data sets; and
repeating the determining of the performance metric of the machine learning model at runtime, the determining of the homogeneity degree, the determining of the type of conceptual drift, the performing of the update and the executing of the updated machine learning model in each of a plurality of iterations to provide automated adaptive updating of the machine learning model in the machine learning system, with different ones of the partial update and the global update being performed in different ones of the iterations based on the type of conceptual drift determined in each such iteration;
wherein determining a type of conceptual drift of the machine learning model based on the performance metric and the homogeneity degree comprises distinguishing between multiple distinct types of conceptual drift including at least conceptual drift in an output of the machine learning model, conceptual drift in an input of the machine learning model, and conceptual drift in a relationship between the input and the output of the machine learning model; and
wherein performing an update of the machine learning model based on the type of the conceptual drift comprises updating different portions of the machine learning model utilizing respective distinct update processes responsive to determining respective different ones of the multiple distinct types of conceptual drift, a first one of the update processes applied responsive to determining a first type of conceptual drift comprising locally updating an output layer of a neural network of the machine learning model through calibration performed in a model calibrator deployed after the output layer of the neural network and configured to automatically adjust outputs of the output layer responsive to detection of the first type of conceptual drift, a second one of the update processes applied responsive to determining a second type of conceptual drift comprising locally updating the output layer of the neural network through parameter adjustment in which one or more parameters of the output layer but no hidden layers of the neural network are automatically updated responsive to detection of the second type of conceptual drift, and a third one of the update processes applied responsive to determining a third type of conceptual drift comprising globally retraining the neural network including the output layer and at least one or more hidden layers of the neural network, the global retraining automatically updating one or more parameters of the output layer and the one or more hidden layers of the neural network responsive to detection of the third type of conceptual drift.

2. The method of claim 1, wherein the performance metric comprises a sequence metric and an accuracy metric of the machine learning model, and wherein determining a type of a conceptual drift of the machine learning model comprises:
when determining that the sequence metric exceeds a sequence metric threshold and the accuracy metric is lower than an accuracy threshold, determining that the conceptual drift of the machine learning model is a conceptual drift of the first type; and
when determining that the sequence metric is lower than the sequence metric threshold and the accuracy metric is lower than the accuracy threshold, determining the type of the conceptual drift of the machine learning model based on a comparison between the homogeneity degree and a homogeneity threshold.

3. The method of claim 2, wherein determining the type of the conceptual drift of the machine learning model based on a comparison between the homogeneity degree and a homogeneity threshold comprises:
when determining that the homogeneity degree exceeds the homogeneity threshold, determining that the conceptual drift of the machine learning model is a conceptual drift of the second type; and
when determining that the homogeneity degree is lower than the homogeneity threshold, determining that the conceptual drift of the machine learning model is a conceptual drift of the third type.

4. The method of claim 2, wherein the machine learning model comprises a feature extraction part for extracting a feature representation from a model input and an output part for providing a model output by processing the feature representation, and performing an update of the machine learning model comprises:
when determining that the conceptual drift of the machine learning model is a conceptual drift of the first type, performing a first partial update of the machine learning model, the first partial update comprising output calibration of the output part.

5. The method of claim 3, wherein the machine learning model comprises a feature extraction part for extracting a feature representation from a model input and an output part for providing a model output by processing the feature representation, and performing an update of the machine learning model comprises:
when determining that the conceptual drift of the machine learning model is a conceptual drift of the second type, performing a second partial update of the machine learning model, the second partial update comprising a local retraining of the output part; and
when determining that the conceptual drift of the machine learning model is a conceptual drift of the third type, performing a global update of the machine learning model, the global update comprising a global retraining of the feature extraction part and the output part.

6. The method of claim 5, wherein at least one of the local retraining and the global retraining is performed based at least on the verification data set.

7. The method of claim 1, wherein the machine learning model comprises a feature extraction part for extracting a feature representation from a model input and an output part for providing a model output by processing the feature representation, and determining the homogeneity degree comprises:
extracting multiple verification feature representations respectively from multiple verification data samples in the verification data set and extracting multiple training feature representations respectively from multiple training data samples in the training data set by the feature extraction part; and
determining homogeneity degrees between the multiple verification feature representations and the multiple training feature representations.

8. The method of claim 7, wherein determining homogeneity degrees between the multiple verification feature representations and the multiple training feature representations comprises:
  clustering the multiple training feature representations to determine corresponding centroids of multiple clusters of the multiple training feature representations;
  determining corresponding distances from the multiple verification feature representations to the corresponding centroids; and
  determining the homogeneity degrees based on the determined corresponding distances.

9. An electronic device, comprising:
  at least one processor; and
  at least one memory coupled to the at least one processor and storing computer-executable instructions, wherein the computer-executable instructions, when executed by the at least one processor, cause the electronic device to perform actions comprising:
  determining, in a machine learning system implemented utilizing the at least one processor and the memory of the electronic device, a performance metric of a machine learning model at runtime, wherein the machine learning model is a trained machine learning model, trained using a training data set;
  determining, in the machine learning system, a homogeneity degree between a verification data set processed by the machine learning model at runtime and the training data set used to train the machine learning model, the verification data set comprising a plurality of verification data samples, each of the verification data samples including a corresponding model input processed by the machine learning model at runtime, wherein the homogeneity degree is determined by performing clustering between multiple feature representations of the training data set to obtain a plurality of clusters, determining feature representations of the verification data samples, computing differences between the feature representations of the verification data samples and one or more characteristics of the clusters, and determining the homogeneity degree based on the computed differences;
  determining, in the machine learning system, a type of a conceptual drift of the machine learning model based on the performance metric and the homogeneity degree;
  performing, in the machine learning system, an update of the machine learning model based on the type of the conceptual drift, wherein the update comprises a partial update or a global update;
  executing the updated machine learning model in the machine learning system to process one or more additional data sets; and
  repeating the determining of the performance metric of the machine learning model at runtime, the determining of the homogeneity degree, the determining of the type of conceptual drift, the performing of the update and the executing of the updated machine learning model in each of a plurality of iterations to provide automated adaptive updating of the machine learning model in the machine learning system, with different ones of the partial update and the global update being performed in different ones of the iterations based on the type of conceptual drift determined in each such iteration;
  wherein determining a type of conceptual drift of the machine learning model based on the performance metric and the homogeneity degree comprises distinguishing between multiple distinct types of conceptual drift including at least conceptual drift in an output of the machine learning model, conceptual drift in an input of the machine learning model, and conceptual drift in a relationship between the input and the output of the machine learning model; and
  wherein performing an update of the machine learning model based on the type of the conceptual drift comprises updating different portions of the machine learning model utilizing respective distinct update processes responsive to determining respective different ones of the multiple distinct types of conceptual drift, a first one of the update processes applied responsive to determining a first type of conceptual drift comprising locally updating an output layer of a neural network of the machine learning model through calibration performed in a model calibrator deployed after the output layer of the neural network and configured to automatically adjust outputs of the output layer responsive to detection of the first type of conceptual drift, a second one of the update processes applied responsive to determining a second type of conceptual drift comprising locally updating the output layer of the neural network through parameter adjustment in which one or more parameters of the output layer but no hidden layers of the neural network are automatically updated responsive to detection of the second type of conceptual drift, and a third one of the update processes applied responsive to determining a third type of conceptual drift comprising globally retraining the neural network including the output layer and at least one or more hidden layers of the neural network, the global retraining automatically updating one or more parameters of the output layer and the one or more hidden layers of the neural network responsive to detection of the third type of conceptual drift.

10. The electronic device of claim 9, wherein the performance metric comprises a sequence metric and an accuracy metric of the machine learning model, and wherein determining a type of a conceptual drift of the machine learning model comprises:
  when determining that the sequence metric exceeds a sequence metric threshold and the accuracy metric is lower than an accuracy threshold, determining that the conceptual drift of the machine learning model is a conceptual drift of the first type; and
  when determining that the sequence metric is lower than the sequence metric threshold and the accuracy metric is lower than the accuracy threshold, determining the type of the conceptual drift of the machine learning model based on a comparison between the homogeneity degree and a homogeneity threshold.

11. The electronic device of claim 10, wherein determining the type of the conceptual drift of the machine learning model based on a comparison between the homogeneity degree and a homogeneity threshold comprises:
  when determining that the homogeneity degree exceeds the homogeneity threshold, determining that the conceptual drift of the machine learning model is a conceptual drift of the second type; and
  when determining that the homogeneity degree is lower than the homogeneity threshold, determining that the conceptual drift of the machine learning model is a conceptual drift of the third type.

12. The electronic device of claim 10, wherein the machine learning model comprises a feature extraction part for extracting a feature representation from a model input and an output part for providing a model output by processing the feature representation, and performing an update of the machine learning model comprises:

when determining that the conceptual drift of the machine learning model is a conceptual drift of the first type, performing a first partial update of the machine learning model and the first partial update comprises output calibration of the output part.

13. The electronic device of claim 11, wherein the machine learning model comprises a feature extraction part for extracting a feature representation from a model input and an output part for providing a model output by processing the feature representation, and performing an update of the machine learning model comprises:

when determining that the conceptual drift of the machine learning model is a conceptual drift of the second type, performing a second partial update of the machine learning model, the second partial update comprising a local retraining of the output part; and when determining that the conceptual drift of the machine learning model is a conceptual drift of the third type, performing a global update of the machine learning model, the global update comprising a global retraining of the feature extraction part and the output part.

14. The electronic device of claim 13, wherein at least one of the local retraining and the global retraining is performed based at least on the verification data set.

15. The electronic device of claim 9, wherein the machine learning model comprises a feature extraction part for extracting a feature representation from a model input and an output part for providing a model output by processing the feature representation, and determining the homogeneity degree comprises:

extracting multiple verification feature representations respectively from multiple verification data samples in the verification data set and extracting multiple training feature representations respectively from multiple training data samples in the training data set by the feature extraction part; and determining homogeneity degrees between the multiple verification feature representations and the multiple training feature representations.

16. The electronic device of claim 15, wherein determining homogeneity degrees between the multiple verification feature representations and the multiple training feature representations comprises:

clustering the multiple training feature representations to determine corresponding centroids of multiple clusters of the multiple training feature representations;

determining corresponding distances from the multiple verification feature representations to the corresponding centroids; and determining the homogeneity degrees based on the determined corresponding distances.

17. A computer program product that is tangibly stored on a non-volatile computer-readable medium and comprises computer-executable instructions, wherein the computer-executable instructions, when executed by a device, cause the device to:

determine, in a machine learning system implemented utilizing processor and memory resources of the device, a performance metric of a machine learning model at runtime, wherein the machine learning model is a trained machine learning model, trained using a training data set;

determine, in the machine learning system, a homogeneity degree between a verification data set processed by the machine learning model at runtime and the training data set used to train the machine learning model, the verification data set comprising a plurality of verification data samples, each of the verification data samples including a corresponding model input processed by the machine learning model at runtime, wherein the homogeneity degree is determined by performing clustering between multiple feature representations of the training data set to obtain a plurality of clusters, determining feature representations of the verification data samples. computing differences between the feature representations of the verification data samples and one or more characteristics of the clusters, and determining the homogeneity degree based on the computed differences;

determine, in the machine learning system, a type of a conceptual drift of the machine learning model based on the performance metric and the homogeneity degree;

perform, in the machine learning system, an update of the machine learning model based on the type of the conceptual drift, wherein the update comprises a partial update or a global update;

execute the updated machine learning model in the machine learning system to process one or more additional data sets; and repeating the determining of the performance metric of the machine learning model at runtime, the determining of the homogeneity degree, the determining of the type of conceptual drift, the performing of the update and the executing of the updated machine learning model in each of a plurality of iterations to provide automated adaptive updating of the machine learning model in the machine learning system, with different ones of the partial update and the global update being performed in different ones of the iterations based on the type of conceptual drift determined in each such iteration;

wherein determining a type of conceptual drift of the machine learning model based on the performance metric and the homogeneity degree comprises distinguishing between multiple distinct types of conceptual drift including at least conceptual drift in an output of the machine learning model, conceptual drift in an input of the machine learning model, and conceptual drift in a relationship between the input and the output of the machine learning model; and wherein performing an update of the machine learning model based on the type of the conceptual drift comprises updating different portions of the machine learning model utilizing respective distinct update processes responsive to determining respective different ones of the multiple distinct types of conceptual drift, a first one of the update processes applied responsive to determining a first type of conceptual drift comprising locally updating an output layer of a neural network of the machine learning model through calibration performed in a model calibrator deployed after the output layer of the neural network and configured to automatically adjust outputs of the output layer responsive to detection of the first type of conceptual drift, a second one of the update processes applied responsive to determining a second type of conceptual drift comprising locally updating the output layer of the neural network through parameter adjustment in which one or more parameters of the output layer but no hidden layers of the neural network are automatically updated responsive to detection of the second type of conceptual drift, and a third one of the update processes applied responsive to determining a third type of conceptual drift comprising globally retraining the neural network including the output layer and at least one or more hidden layers of the neural network, the global retraining automatically updating one or more parameters of the output layer and the one or more hidden layers of the neural network responsive to detection of the third type of conceptual drift.

18. The computer program product of claim 17, wherein the performance metric comprises a sequence metric and an accuracy metric of the machine learning model, and wherein determining a type of a conceptual drift of the machine learning model comprises:
when determining that the sequence metric exceeds a sequence metric threshold and the accuracy metric is lower than an accuracy threshold, determining that the conceptual drift of the machine learning model is a conceptual drift of the first type; and
when determining that the sequence metric is lower than the sequence metric threshold and the accuracy metric is lower than the accuracy threshold, determining the type of the conceptual drift of the machine learning model based on a comparison between the homogeneity degree and a homogeneity threshold.

19. The computer program product of claim 18, wherein determining the type of the conceptual drift of the machine learning model based on a comparison between the homogeneity degree and a homogeneity threshold comprises:
when determining that the homogeneity degree exceeds the homogeneity threshold, determining that the conceptual drift of the machine learning model is a conceptual drift of the second type; and
when determining that the homogeneity degree is lower than the homogeneity threshold, determining that the conceptual drift of the machine learning model is a conceptual drift of the third type.

20. The computer program product of claim 18, wherein the machine learning model comprises a feature extraction part for extracting a feature representation from a model input and an output part for providing a model output by processing the feature representation, and performing an update of the machine learning model comprises:
when determining that the conceptual drift of the machine learning model is a conceptual drift of the first type, performing a first partial update of the machine learning model, the first partial update comprising output calibration of the output part.

* * * * *